United States Patent
Ahn et al.

(10) Patent No.: US 10,013,741 B2
(45) Date of Patent: Jul. 3, 2018

(54) METHOD FOR DEBLURRING VIDEO USING MODELING BLURRED VIDEO WITH LAYERS, RECORDING MEDIUM AND DEVICE FOR PERFORMING THE METHOD

(71) Applicant: Korea Institute of Science and Technology, Seoul (KR)

(72) Inventors: Byeongjoo Ahn, Seoul (KR); Ig Jae Kim, Seoul (KR); Junghyun Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/191,040

(22) Filed: Jun. 23, 2016

(65) Prior Publication Data
US 2017/0011494 A1    Jan. 12, 2017

(30) Foreign Application Priority Data
Jul. 7, 2015   (KR) ................. 10-2015-0096624

(51) Int. Cl.
*H04N 5/217* (2011.01)
*G06T 5/00* (2006.01)

(52) U.S. Cl.
CPC .... *G06T 5/003* (2013.01); *G06T 2207/10016* (2013.01); *G06T 2207/20201* (2013.01)

(58) Field of Classification Search
CPC .......... G06T 5/003; G06T 2207/10016; G06T 2207/20201
See application file for complete search history.

(56) References Cited

U.S. PATENT DOCUMENTS 8,380,000 B2    2/2013 Lee et al.
8,532,421 B2 *  9/2013 Wang ................. G06T 5/003
                                            382/255

(Continued)

FOREIGN PATENT DOCUMENTS

KR    10-2010-0079658 A    7/2010
KR    10-2013-0101829 A    9/2013

(Continued)

OTHER PUBLICATIONS

Moshe Ben-Ezra and Shree K. Nayar, Motion-Based Motion Deblurring, Jun. 2004, IEEE Transactions on Pattern Analysis and Machine Intelligence, vol. 26, No. 6, pp. 689-699.*

(Continued)

*Primary Examiner* — Padma Haliyur
(74) *Attorney, Agent, or Firm* — NSIP Law (57) ABSTRACT

A video deblurring method based on a layered blur model includes estimating a latent image, an object motion and a mask for each layer in each frame using images consisting of a combination of layers during an exposure time of a camera when receiving a blurred video frame, applying the estimated latent image, object motion and mask for each layer in each frame to the layered blur model to generate a blurry frame, comparing the generated blurry frame and the received blurred video frame, and outputting a final latent image based on the estimated object motion and mask for each layer in each frame, when the generated blurry frame and the received blurred video frame match. Accordingly, by modeling a blurred image as an overlap of images consisting of a combination of foreground and background during exposure, more accurate deblurring results at object boundaries can be obtained.

16 Claims, 6 Drawing Sheets

(56) References Cited

U.S. PATENT DOCUMENTS

| | | |
|---|---|---|
| 2013/0236114 A1 | 9/2013 | Cho et al. |
| 2014/0009585 A1 | 1/2014 | Campbell et al. |
| 2014/0347540 A1 | 11/2014 | Kang |
| 2015/0178898 A1 | 6/2015 | Routhier |

FOREIGN PATENT DOCUMENTS

| | | |
|---|---|---|
| KR | 10-2014-0004592 A | 1/2014 |
| KR | 10-1341871 B1 | 1/2014 |
| KR | 10-1460317 B1 | 11/2014 |

OTHER PUBLICATIONS

Cho, Sunghyun, et al. "Removing Non-Uniform Motion Blur From Images." *2007 IEEE 11th International Conference on Computer Vision*. IEEE, 2007. (8 pages, in English).

Cho, Sunghyun, et al. "Video Deblurring For Hand-Held Cameras Using Patch-Based Synthesis." *ACM Transactions on Graphics (TOG)* 31.4 (2012): 64. (9 pages, in English).

Seok Lee, Hee, and Kuoung Mu Lee. "Dense 3D Reconstruction From Severely Blurred Images Using A Single Moving Camera." *Proceedings of the IEEE Conference on Computer Vision and Pattern Recognition*. 2013. (8 pages, in English).

Wulff, Jonas, et al. "Modeling Blurred Video With Layers." *European Conference on Computer Vision*. Springer International Publishing, 2014.

\* cited by examiner

METHOD FOR DEBLURRING VIDEO USING MODELING BLURRED VIDEO WITH LAYERS, RECORDING MEDIUM AND DEVICE FOR PERFORMING THE METHOD

DESCRIPTION OF GOVERNMENT-SPONSORED RESEARCH AND DEVELOPMENT

This research is done in support of CT infrastructure building project (Development of high-tech technology for imaging and rendering in cooperation with multiple autonomous flying objects for large-scale performance and broadcasting, Project Serial No.: 1375025947) in the Ministry of culture, sports and tourism under the supervision of Gwangju Institute of Science and Technology.

CROSS-REFERENCE TO RELATED APPLICATION

This application claims priority to Korean Patent Application No. 10-2015-0096624 filed on Jul. 7, 2015, and all the benefits accruing therefrom under 35 U.S.C. § 119, the contents of which in its entirety are herein incorporated by reference.

BACKGROUND

1. Field

The present disclosure relates to a video deblurring method based on a layered blur model and a recording medium and device for performing the same, and more particularly, to a video deblurring method for accurately restoring object boundaries as well as each layer with the consideration of interaction between the layers, and a recording medium and device for performing the same.

2. Description of the Related Art

Layered generative blur model is frequently used in the motion deblurring field to handle locally varying blurs, which is caused by object motion or depth variation in a scene. However, conventional layered blur models have a limitation in representing the layer interactions occurring at occlusion boundaries. Thereby an error may occur in deblurring results at object boundaries.

Motion blur is one of the most common artifacts in video. There have been extensive studies to remove the motion blur, and they are roughly categorized into spatially-invariant and spatially-variant configurations. Early works on spatially-invariant blur achieved some success in single-image deblurring, and these techniques were extended to video deblurring.

However, the spatially-invariant blur model cannot deal with a rotational camera motion, which is a significant and common component in practical scenarios. To overcome this limitation, some researchers parameterized the blur as a possible camera motions in 3D, and this approach is applied to single-image and video. Although these methods solved spatially-variant motion blur in some extent, they were limited to the smoothly-varying blur which represents a global motion of the camera in single depth image.

In the case of abruptly-varying blur, generated by depth variation or object motion, the blur cannot be represented by a simple homography, but the blur kernel of each segment should be estimated separately. To address this problem, Lee and Lee proposed methods that estimate depth maps from blurry images based on the commutative property of convolution. Given this estimated depth maps, they obtained spatially varying blur kernel that can cope with depth variation in a static scene.

For a dynamic scene including object motion, Cho et al. segmented an image into regions of homogeneous motions by estimating the motion simultaneously, and obtained corresponding segment-wise blur kernel for restoring the image. Also, Cho et al. used patch-based synthesis for deblurring by detecting and interpolating proper sharp patches at nearby frame.

Although these methods solved abruptly-varying blur by estimating the blur of each segment separately, they did not consider a very important problem seriously, that is 'the occlusion problem during a blur process'. Occlusion in motion causes an interaction between the segments because a pixel value around object boundaries becomes a weighted sum of pixels from multiple segments, and it makes the deblurring problem even more difficult.

To handle this interaction, several researchers proposed layered blur models that express boundaries of moving objects as a linear combinations of the blurred foreground and the background. However, their methods assumed the background to be static and only foreground motion was modeled, so there were limitations in representing general blurs.

To overcome these limitations, Wulff and Black recently proposed a method that explicitly models a blur image as a composition of individually blurred foreground and background. This generative blur model expresses not only the motion of each layer but also the interaction between the layers caused by the occlusion during the blur process. By making use of this model, they could handle motion blurred videos even when both layers are dynamic while considering the occlusion.

However, their blur model is not generally true but only valid for some specific physical situations. For example, in the case of blurry images caused by the situation that both the hand and the background are moving to the right-side at the same speed, a blur is seen, in actual occurrence, as an overlap of images the camera sees while the shutter is open.

Accordingly, since some regions in the background are occluded by the hand all the time while the shutter is open, it should not be exposed in the blurry image. However, since in synthesized blurry images by conventional models, the background occluded by the hand is exposed in some instances, it shows that the model violates the actual data-acquisition process. This error in blur generative model can cause artifacts not only in synthesized blurry images but also in deblurring results. Therefore, there is the demand for a robust video deblurring model that allows accurate deblurring even in general situations.

SUMMARY

The present disclosure is designed to meet the demand, and therefore, the present disclosure is directed to providing an occlusion-aware video deblurring method based on a layered blur model that can handle abruptly varying blurs.

The present disclosure is further directed to providing a recording medium having a computer program recorded thereon for performing the occlusion-aware video deblurring method based on a layered blur model.

The present disclosure is further directed to providing a device for performing the occlusion-aware video deblurring method based on a layered blur model.

A video deblurring method based on a layered blur model according to an embodiment for achieving the object of the present disclosure includes estimating a latent image, an object motion and a mask for each layer in each frame using images consisting of a combination of layers during an exposure time of a camera when receiving a blurred video frame, applying the estimated latent image, object motion and mask for each layer in each frame to the layered blur model to generate a blurry frame, comparing the generated blurry frame and the received blurred video frame, and outputting a final latent image based on the estimated object motion and mask for each layer in each frame, when the generated blurry frame and the received blurred video frame match.

In an embodiment of the present disclosure, the estimating of a latent image, an object motion and a mask for each layer in each frame may include estimating a latent image for each layer in each frame, estimating a motion for each layer in each frame, and estimating a mask for each layer in each frame.

In an embodiment of the present disclosure, the estimating of a latent image, an object motion and a mask for each layer in each frame may include estimating a latent image of a foreground layer and a latent image of a background layer in each frame, estimating a motion of the foreground layer and a motion of the background layer in each frame, and estimating a layer mask in each frame.

In an embodiment of the present disclosure, the layered blur model may use the following equation:

$$B_i = \frac{1}{M} \sum_{k=1}^{M} \left( (1 - W_{i,t_k}^1 g^1) \odot W_{i,t_k}^0 a^0 + W_{i,t_k}^1 a^1 \right)$$

where $B_i$ is a generated ith blurry frame, M is the number of intervals used to divide the exposure time of the camera uniformly, $a^l$ and $g^l$ are a latent image and a mask of layer l, $W_{i,t}^l$ is a warping matrix that warps an image to an intermediate image at time $t^{i-1}+t$ for the layer l, $t^i$ denotes the time at frame i, and $t_k$ denotes each time at which the exposure time is divided into intervals uniformly.

In an embodiment of the present disclosure, the warping matrix may be obtained by linearly interpolating the motion between frames.

In an embodiment of the present disclosure, the comparing of the generated blurry frame and the received blurred video frame may include determining that the generated blurry frame and the received blurred video frame match, when a data difference between the generated blurry frame and the received blurred video frame is less than or equal to a threshold.

In an embodiment of the present disclosure, the video deblurring method based on a layered blur model may further include, when the generated blurry frame and the received blurred video frame fail to match, iteratively performing a process including estimating a latent image, an object motion and a mask for each layer in each frame, applying the estimated latent image, object motion and mask for each layer in each frame to the layered blur model to generate a blurry frame, and comparing the generated blurry frame and the received blurred video frame.

In an embodiment of the present disclosure, when the process is performed iteratively a preset number of times, an object motion and a mask for each layer in a blurry frame having a data difference between the generated blurry frame and the received blurred video frame closest to the threshold may be used.

A computer-readable recording medium according to an embodiment for achieving another object of the present disclosure has a computer program recorded thereon for performing the video deblurring method based on a layered blur model.

A video deblurring device based on a layered blur model according to an embodiment for achieving still another object of the present disclosure includes a reverse estimation unit configured to estimate a latent image, an object motion and a mask for each layer in each frame using images consisting of a combination of layers during an exposure time of a camera when receiving a blurred video frame, a blurry frame generation unit configured to apply the estimated latent image, object motion and mask for each layer in each frame to the layered blur model to generate a blurry frame, a data comparison unit configured to compare the generated blurry frame and the received blurred video frame, and a deblurring unit configured to output a final latent image based on the estimated object motion and mask for each layer in each frame, when the generated blurry frame and the received blurred video frame match.

In an embodiment of the present disclosure, the reverse estimation unit may include an image estimation unit configured to estimate a latent image for each layer in each frame, a motion estimation unit configured to estimate a motion for each layer in each frame, and a mask estimation unit configured to estimate a mask for each layer in each frame.

In an embodiment of the present disclosure, the reverse estimation unit may include an image estimation unit configured to estimate a latent image of a foreground layer and a latent image of a background layer in each frame, a motion estimation unit configured to estimate a motion of the foreground layer and a motion of the background layer in each frame, and a mask estimation unit configured to estimate a layer mask in each frame.

In an embodiment of the present disclosure, the blurry frame generation unit may use the layered blur model using the following equation:

$$B_i = \frac{1}{M} \sum_{k=1}^{M} \left( (1 - W_{i,t_k}^1 g^1) \odot W_{i,t_k}^0 a^0 + W_{i,t_k}^1 a^1 \right)$$

where $B_i$ is a generated ith blurry frame, M is the number of intervals used to divide the exposure time of the camera uniformly, $a^l$ and $g^l$ are a latent image and a mask of layer l, $W_{i,t}^l$ is a warping matrix that warps an image to an intermediate image at time $t^{i-1}+t$ for the layer l, $t^i$ denotes the time at frame i, and $t_k$ denotes each time at which the exposure time is divided into M intervals uniformly.

In an embodiment of the present disclosure, the warping matrix may be obtained by linearly interpolating the motion between frames.

In an embodiment of the present disclosure, the data comparison unit may determine that the generated blurry frame and the received blurred video frame match, when a data difference between the generated blurry frame and the received blurred video frame is less than or equal to a threshold.

In an embodiment of the present disclosure, when the data comparison unit determines that the generated blurry frame and the received blurred video frame fail to match, the reverse estimation unit may iteratively perform the estimation of a latent image, an object motion and a mask for each layer in each frame, and the blurry frame generation unit may apply the latent image, object motion and mask estimated by the reverse estimation unit for each layer in each frame to the layered blur model to iteratively generate a blurry frame.

In an embodiment of the present disclosure, when the reverse estimation unit performs the estimation of a latent image, an object motion and a mask for each layer in each frame a preset number of times, the deblurring unit may output a final latent image using an object motion and a mask for each layer in a blurry frame having a data difference between the generated blurry frame and the received blurred video frame closest to the threshold.

According to the video deblurring method of the present disclosure, a new layered blur model reflecting an actual blur generation process is proposed, and through this model, an object motion, a mask, and a latent image can be simultaneously obtained. Accordingly, the present disclosure can deblur a video including an object moving faster than background by modeling regions that are occluded or appear during a blur process. Furthermore, clear deblurring results can be obtained through a deconvolution method including spatial prior distribution.

In addition, by representing blurred images using optical flow, the present disclosure is technology that can deal with not only spatially-variant blurs generated by depth variations but also spatially-variant blurs generated by object motions. Furthermore, accurate deblurring at boundaries can be achieved by modeling a phenomenon appearing at boundaries where depth variations occur.

Further, the present disclosure is technology that reflects an actual data acquisition process by modeling a blurred image as an overlap of images consisting of a combination of foreground and background during exposure. Through this model, occlusion at boundaries can be represented in general situations and more accurate deblurring results at object boundaries can be obtained.

DETAILED DESCRIPTION

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but not necessarily mutually exclusive. For example, particular shapes, structures and features described herein in connection with one embodiment can be embodied as other embodiment without departing from the spirit and scope of the present disclosure. It should be further understood that changes can be made to locations or arrangements of individual elements in each disclosed embodiment without departing from the spirit and scope of the present disclosure. Accordingly, the following detailed description is not intended to be construed in limiting senses, and the scope of the present disclosure is only defined, if appropriately described, by the appended claims together with the subject matter to which the claims are entitled and equivalents thereto. In the drawings, similar reference numerals denote same or similar functions in many aspects.

Hereinafter, preferred embodiments of the present disclosure will be described in further detail with reference to the accompanying drawings.

Figure 1:
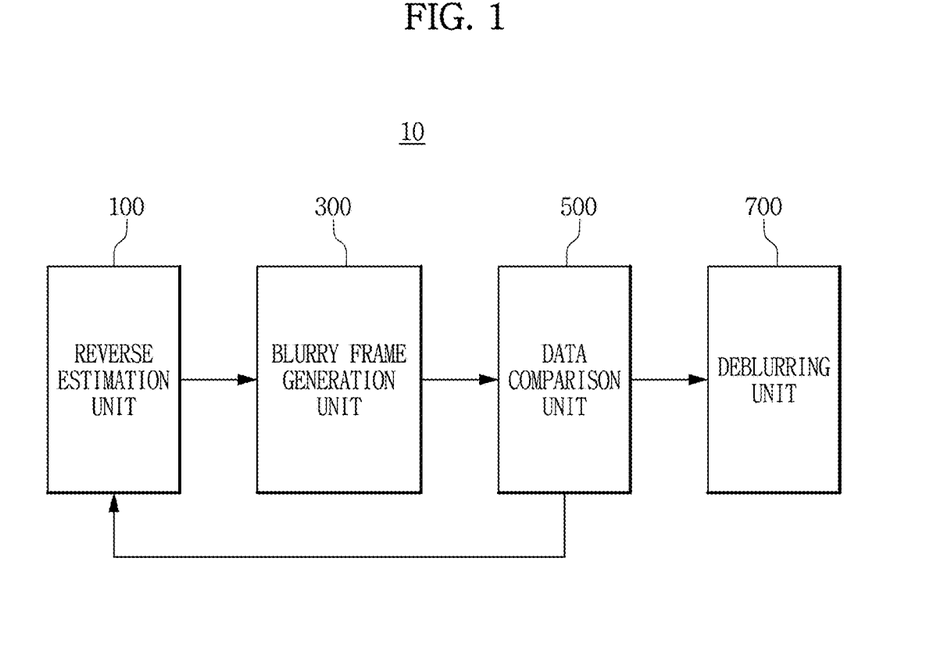
FIG. 1 is a block diagram of a video deblurring device based on a layered blur model according to an embodiment of the present disclosure.

FIG. 1 is a block diagram of a video deblurring device based on a layered blur model according to an embodiment of the present disclosure.

The video deblurring device 10 based on a layered blur model (hereinafter, device) according to the present disclosure performs occlusion-aware video deblurring based on an accurate layered blur model that can handle abruptly varying blurs.

Referring to FIG. 1, the device 10 according to the present disclosure includes a reverse estimation unit 100, a blurry frame generation unit 300, a data comparison unit 500, and a deblurring unit 700.

Each element of the device 10 is now described in brief, and a video deblurring method based on a layered blur model according to the present disclosure will be described in detail with reference to FIG. 3 and the subsequent drawings.

The device 10 of the present disclosure is where software (application) for performing video deblurring based on a layered blur model is installed and executed, and configuration of the reverse estimation unit 100, the blurry frame generation unit 300, the data comparison unit 500 and the blurring unit 700 may be controlled by the software for performing video deblurring executed in the device 10.

The device 10 may be a separate terminal or a certain module of the terminal. For example, the device 10 may be a display device such as an image display device and an image output device, or a certain device that makes up the display device.

Also, configuration of the reverse estimation unit 100, the blurry frame generation unit 300, the data comparison unit 500 and the blurring unit 700 may be formed as an integrated module or may be incorporated into at least one module. To the contrary, each element may be formed as a separate module.

The device 10 may have mobility or may be stationary. The device 10 may be in the form of a server or an engine, and can be interchangeably used with the terms device, apparatus, terminal, user equipment (UE), mobile station (MS), wireless device, and handheld device.

The device 10 may execute or create a variety of software based on an operating system (OS), i.e., a system. The operating system is a system program for allowing software to use hardware of the device, and may include both mobile computer operating system such as Android OS, iOS, Windows mobile OS, Bada OS, Symbian OS and Blackberry OS, and computer operating system such as Windows-based, Linux-based, Unix-based, MAC, AIX and HP-UX.

The reverse estimation unit 100 receives a blurred video frame from an image input device such as a camera, and estimates data for video deblurring. Specifically, the reverse estimation unit 100 estimates data for each layer in each frame using images consisting of a combination of layers during the exposure time of the camera. The estimated data may be a latent image, an object motion, and a mask in each layer. The latent image is an unblurred image.

Conventional technology performs deblurring using images consisting of a combination of identical layers in frames inputted during a predetermined period of time, while the present disclosure performs deblurring using images consisting of a combination of different layers.

Figure 2:
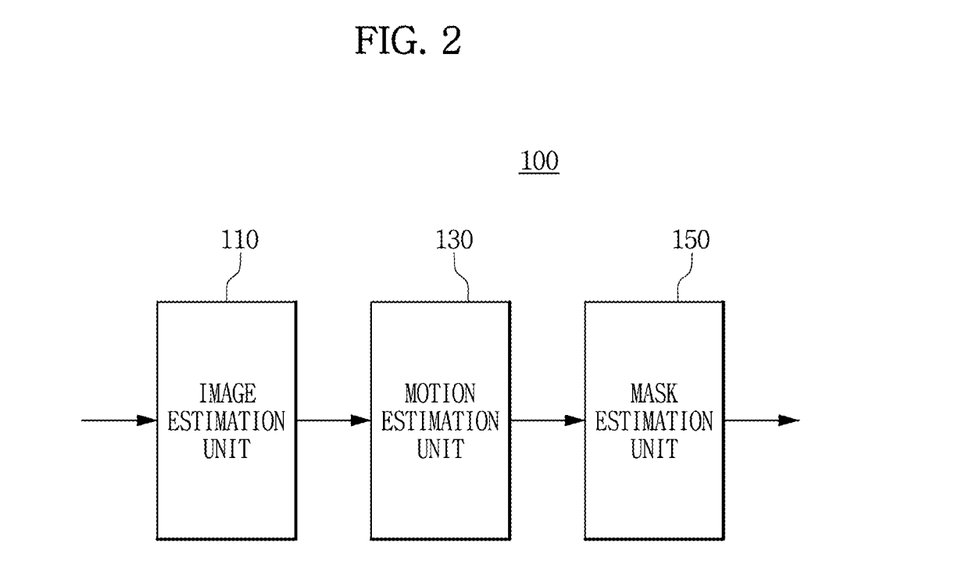
FIG. 2 is a block diagram of a reverse estimation unit of FIG. 1.

Referring to FIG. 2, the reverse estimation unit 100 may include an image estimation unit 110 to estimate a latent image for each layer in each frame, a motion estimation unit 130 to estimate a motion for each layer in each frame, and a mask estimation unit 150 to estimate a mask for each layer in each frame. That is, when a frame consists of n layers, n latent images, n object motions, and n masks for each frame are outputted from the reverse estimation unit 100.

For example, when each frame consists of two layers, i.e., a foreground layer and a background layer, the image estimation unit 110 estimates a latent image of the foreground layer and a latent image of the background layer in each frame, and the motion estimation unit 130 estimates a motion of the foreground layer and a motion of the background layer in each frame. The mask estimation unit 150 estimates a mask of the foreground layer and a mask of the background layer in each frame.

However, when a layer consists of foreground and background, then all regions other than foreground are background, it is possible to represent a background mask using only a foreground mask. Accordingly, because it is possible to represent a background mask without setting a variable (1-foreground mask) for the background mask, only one mask can be estimated.

The blurry frame generation unit 300 applies the estimated latent image, object motion and mask for each layer in each frame to the layered blur model to generate a blurry frame.

The layered blur model according to the present disclosure is a layered blur model reflecting an actual blur process, and correctly represents occlusion during a blur process, thereby improving a deblurring effect at boundaries.

The data comparison unit 500 compares the generated blurry frame and the received blurred video frame. In this instance, the data comparison unit 500 calculates a data difference between the generated blurry frame and the received blurred video frame, and when the difference is less than or equal to a threshold, the data comparison unit 500 determines that the generated blurry frame and the received blurred video frame match.

When the data comparison unit 500 determines that the generated blurry frame and the received blurred video frame do not match, the data comparison unit 500 notifies the reverse estimation unit 100 of the result. The reverse estimation unit 100 which was notified of non-matching estimates the latent image, object motion and mask for each layer in each frame again, and the blurry frame generation unit 300 generates the blurry frame again.

The data comparison unit 500 compares the re-generated blurry frame and the received blurred video frame, and when they do not match, this process is performed iteratively until matching is determined. In an embodiment, even after the process is performed iteratively a preset number of times, when they do not match, an object motion and a mask for each layer in a blurry frame having a data difference with the received blurred video frame among the blurry frames generated so far closest to the threshold is outputted to the blurring unit 700.

The blurring unit 700 outputs a final latent image based on the object motion and mask estimated by the reverse estimation unit 100 for each layer in each frame. The final latent image may be outputted using the layered blur model used by the blurry frame generation unit 300. The latent image for each layer is finally estimated once more using a value finally outputted from the reverse estimation unit 100 for the object motion and mask for each layer in the layered blur model.

The present disclosure reflects an actual data acquisition process by modeling a blurred image as an overlap of images consisting of a combination of foreground and background during exposure. Accordingly, through the present disclosure, occlusion at boundaries can be represented in general situations and more accurate deblurring results at object boundaries can be obtained.

Figure 3:
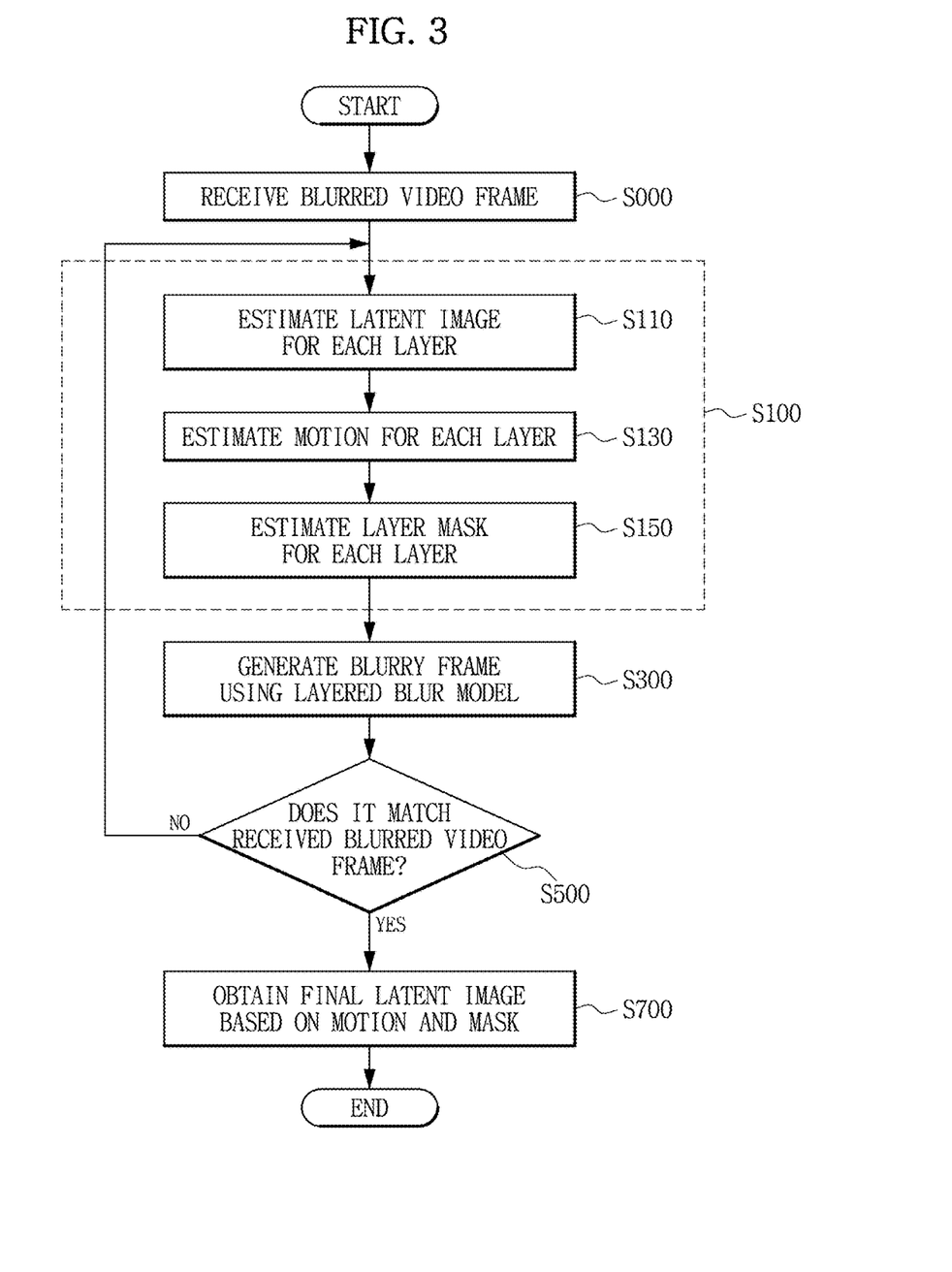
FIG. 3 is a flowchart illustrating a video deblurring method based on a layered blur model according to an embodiment of the present disclosure.

FIG. 3 is a flowchart of a video deblurring method based on a layered blur model according to an embodiment of the present disclosure.

The video deblurring method based on a layered blur model in this embodiment may be performed by substantially the same configuration as the device 10 of FIG. 1. Accordingly, same reference numerals are given the same elements as the device 10 of FIG. 1, and duplicates are omitted herein. In addition, the video deblurring method based on a layered blur model according to this embodiment may be performed by the software (application) for performing video deblurring.

Referring to FIG. 3, according to the video deblurring method based on a layered blur model according to this embodiment, when a blurred video frame is received from an image input device such as a camera (S000), data for video deblurring is estimated (S100).

In the step for estimating data for video deblurring (S100), data for each layer in each frame is estimated using images consisting of a combination of layers during the exposure time of the camera.

Specifically, the step for estimating data for video deblurring (S100) may include estimating a latent image for each layer in each frame (S110), estimating a motion for each layer in each frame (S130), and estimating a mask for each layer in each frame (S150).

When a frame consists of n layers, n latent images, n object motions and n masks are outputted for each frame. However, when a frame consists of two layers (a foreground layer, a background layer), then all regions other than foreground become background, it is possible to represent a background mask using only a foreground mask. Accordingly, because it is possible to represent a background mask without setting a variable (1-foreground mask) for the background mask, only one mask can be estimated.

The estimated latent image, object motion and mask for each layer in each frame is applied to the layered blur model to generate a blurry frame (S300).

The present disclosure proposes an accurate layered blur model reflecting an actual data acquisition process.

Figure 4:
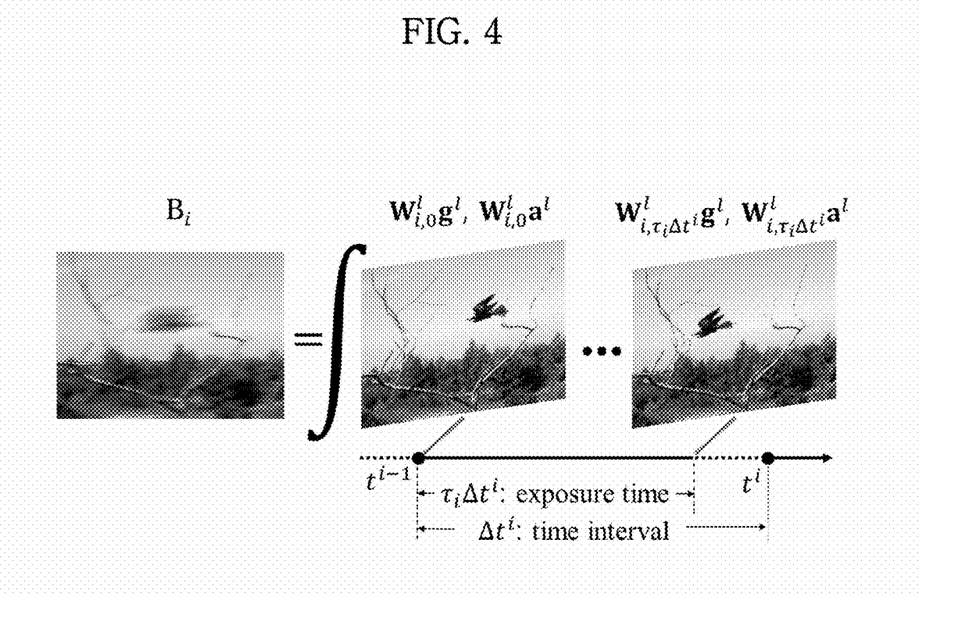
FIG. 4 is a diagram illustrating a layered blur model according to the present disclosure.

Referring to FIG. 4, the layered blur model proposed by the present disclosure is shown. In the layered blur model according to the present disclosure, a blurry frame is generated by integrating images during exposure, each of which is a composition of layers.

In an actual data acquisition process, a blurry image is generated by integrating images the camera sees during exposure. When this concept is applied to the layered blur model, a blurred video frame can be represented by Equation 1 as follows.

$$b_i = \frac{1}{\tau_i \Delta t^i} \int_0^{\tau_i \Delta t^i} (1 - W_{i,t}^1 g^1) \odot W_{i,t}^0 a^0 + W_{i,t}^1 a^1 dt, \quad \text{[Equation 1]}$$

$b_i$ denotes a ith blurry video frame, and $a^l$ and $g^l$ denote a latent image and a mask of layer l, respectively. In this instance, larger l's are closer to the observer. $W_{i,t}^l$ is a warping matrix that warps an image to intermediate image at time $t^{i-1}+t$ for the layer l. $t^i$ is the time at frame i and $t_i$ is a camera duty cycle which represents relative exposure time.

In an embodiment, describing l=2 in which an image consists of foreground and background, the motion of each layer is assumed to be affine motion, and the value of mask is set as binary, 0 or 1. Each variable was in column-vectorized form, i.e., $b_i \in R^{3\ mn \times 1}$, $a^l \in R^{3\ mn \times 1}$, $g^l \in R^{3\ mn \times 1}$ for an image in M×n×3.

The warping matrix is obtained by linearly interpolating the motion between frames. Although this interpolation is valid only when the speed of motion is constant during exposure, it can be justified to some degree because the exposure time of a video frame is short generally.

Figure 5:
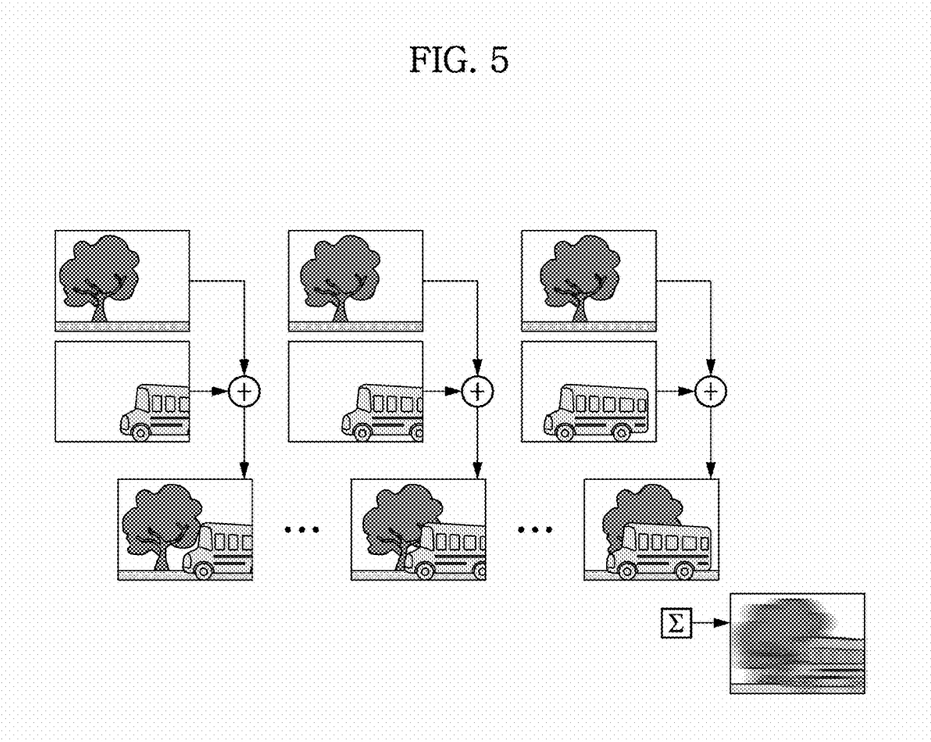
FIG. 5 is a diagram showing the order of layer composition and blur according to the present disclosure.

Referring to FIG. 5, the order of layer composition and blur according to the present disclosure is shown, and the present disclosure performs deblurring using a combination of images consisting of different layers. Conventional technology performs deblurring using images consisting of a combination of identical layers in frames inputted during a predetermined period of time, while the present disclosure generates a blurry frame from images consisting of a combination of different layers.

The blurry frame generated by the application with the layered blur model according to the present disclosure can be represented as Equation 2 below. Equation 2 is the discretized form of Equation 1 for applications in computer deblurring.

$$B_i = \frac{1}{M} \sum_{k=1}^{M} \left( (1 - W_{i,t_k}^1 g^1) \odot W_{i,t_k}^0 a^0 + W_{i,t_k}^1 a^1 \right) \quad \text{[Equation 2]}$$

where $B_i$ is the generated ith blurry frame, M is the number of intervals used to divide the exposure time of the camera uniformly, $a^l$ and $g^l$ are a latent image and a mask of layer l, $W_{i,t}^l$ is a warping matrix that warps an image to an intermediate image at time $t^{i-1}+t$ for the layer l, $t^i$ denotes the time at frame i, and $t_k$ denotes each time at which the exposure time is divided into M intervals uniformly.

When the blurry frame is generated using the layered blur model, it is determined whether the generated blurry frame $B_i$ and the received blurred video frame $b_i$ match by comparing them (S500).

In the step for determining whether the generated blurry frame $B_i$ and the received blurred video frame $b_i$ match by comparing them (S500), when a data difference between the generated blurry frame and the received blurred video frame is less than or equal to a threshold, it is determined that the generated blurry frame and the received blurred video frame match.

The data difference for determining whether the generated blurry frame $B_i$ and the received blurred video frame $b_i$ match uses data terms according to Equation 3 below.

$$E_{data}(a, g, \theta, b) = \quad \text{[Equation 3]}$$

$$\left\| \frac{1}{M} \sum_{k=1}^{M} \left( (1 - W_{i,t_k}^1 g^1) \odot W_{i,t_k}^0 a^0 + W_{i,t_k}^1 a^1 \right) - b_i \right\|$$

where a set of latent images in each layer was indicated as $a=\{a^0, a^1\}$, a set of masks in each layer was indicated as $g=\{g^1\}$, a set of position parameters for each layer in each frame was indicated as $\theta=\{\theta_0^1, \theta_0^1, \ldots\}$, and a set of blurry frames being entered as input was indicated as $b=\{b_0, b_1, \ldots\}$. Furthermore, the position parameter $\theta_i^l$ denotes the position of layer l in the frame i. In addition, for discretization, the exposure time was divided into M intervals uniformly and expressed as $$t_k = \tau_i \Delta t^i \frac{k}{M}, (k \in \{1, \ldots, M\}).$$

The latent image, mask, and object motion can be obtained by finding $(a,g,\theta)$ that minimizes the value of the data terms.

When the generated blurry frame and the received blurred video frame do not match, the step for estimating a latent image, an object motion and a mask for each layer in each frame (S100), the step for applying to the layered blur model to generate a blurry frame (S300), and the step for comparing the generated blurry frame and the received blurred video frame (S500) may be performed iteratively until two frame values match.

Even after the steps are performed iteratively a preset number of times, when the two frame values do not match, an object motion and a mask for each layer in a blurry frame having a data difference between the generated blurry frame and the received blurred video frame closest to the threshold is outputted.

To express these iterations mathematically, a method is used in which each variable is individually optimized iteratively to find $(a,g,\theta)$ that minimizes the data terms proposed in Equation 3. Equation 3 can be written as Equation 4 for optimization.

$$\min_x \| K_i x - y_i \| \quad \text{[Equation 4]}$$

where $x \in \{a^0, a^1, g^1\}$, $k_i$ and $y_i$ are defined based on each variable as follows.

First, $x=a^0$ denotes the latent image of the background layer, and $K_i$ and $y_i$ are defined as Equation 5 and Equation 6 below.

$$K_i = \frac{1}{M} \sum_{k=1}^{M} \text{diag}(1 - W_{i,t_k}^1 g^1) W_{i,t_k}^0 \quad \text{[Equation 5]}$$

$$y_i = b_i - \frac{1}{M} \sum_{k=1}^{M} W_{i,t_k}^1 a^1 \quad \text{[Equation 6]}$$

$x=a^1$ denotes the latent image of the foreground layer, and $K_i$ and $y_i$ are defined as Equation 7 and Equation 8 below.

$$K_i = \frac{1}{M}\sum_{k=1}^{M} W_{i,t_k}^1 \qquad \text{[Equation 7]}$$

$$y_i = b_i - \frac{1}{M}\sum_{k=1}^{M} (1 - W_{i,t_k}^1 g^1) \odot W_{i,t_k}^0 a^0 \qquad \text{[Equation 8]}$$

$x=g^1$ denotes the mask for each layer, and $K_i$ and $y_i$ and are defined as Equation 9 and Equation 10 below.

$$K_i = -\frac{1}{M}\sum_{k=1}^{M} \text{diag}(W_{i,t_k}^0 a^0) W_{i,t_k}^1 \qquad \text{[Equation 9]}$$

$$y_i = b_i - \frac{1}{M}\sum_{k=1}^{M} (W_{i,t_k}^0 a^0 + W_{i,t_k}^1 a^1) \qquad \text{[Equation 10]}$$

Through Equations 4 to 10, optimization can be done by writing the equations in general deconvolution form such as Equation 11 below.

$$\min_{x}\|K_i x - y_i\| + E_{reg}(x) \qquad \text{[Equation 11]}$$

When the generated blurry frame $B_i$ and the received blurred video frame $b_i$ match by comparing them in S500, a final latent image is outputted based on the estimated latent image, object motion and mask for each layer in each frame (S700). That is, for the object motion and mask, an estimated value until iteration ends is used as a final value, and for the latent image, a value obtained by updating once more is used as a final value. Equations 5 to 8 are used to output the latent image for each layer.

The present disclosure proposes an occlusion-aware video deblurring method based on an accurate layered blur model that can deal with abruptly varying blurs. Accordingly, taking interaction between layers into account, not only each layer but also their boundaries can be accurately restored, and though this, the latent image, object motion and mask can be accurately estimated.

Figure 6A:
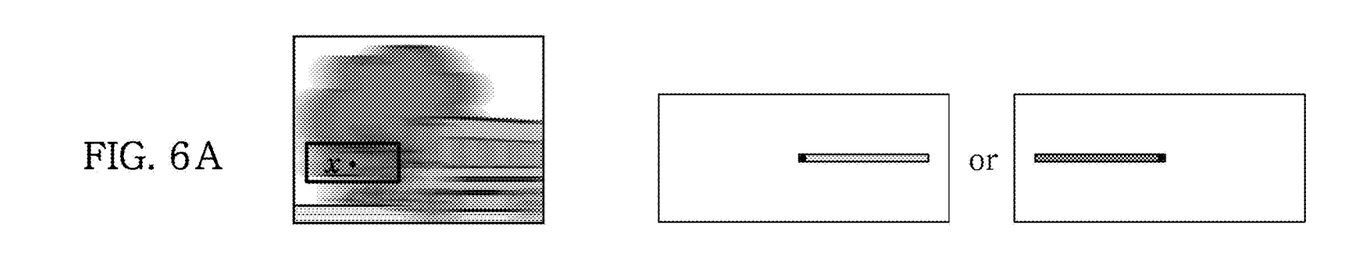
FIGS. 6A to 6C show results of blur kernels at boundaries obtained by conducting a comparative test with early models to demonstrate the effect of the present disclosure.
Figure 6B:
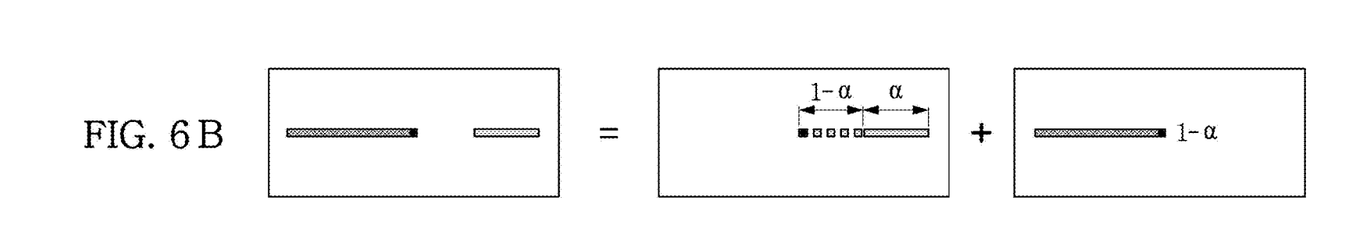
Figure 6C:
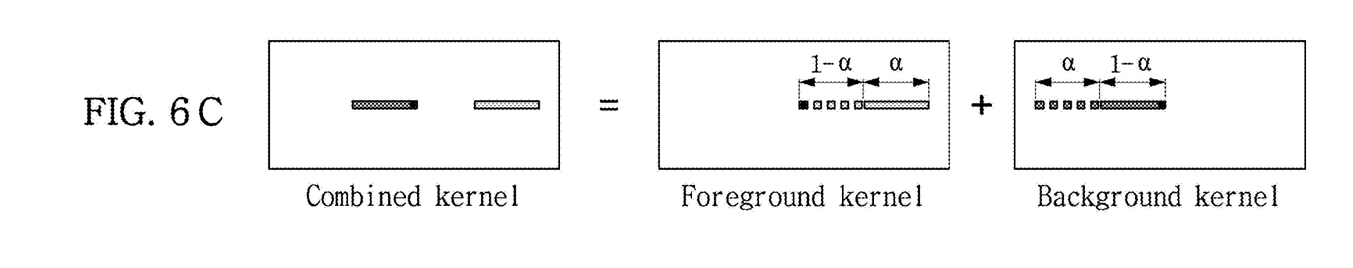

FIGS. 6A to 6C show results of blur kernels at boundaries obtained by conducting a comparative test with early models to demonstrate the effect of the present disclosure.

Referring to FIG. 6A, shown is a blurred image obtained in a situation in which the foreground is moving to the left-side and the background is moving to the right-side. Early models that do not take boundaries into account represent a blur kernel at boundaries as a blur kernel either of the foreground or of the background as shown in FIG. 6A.

In recent model, the blur kernel at boundaries is found as a combination of blur kernels of the foreground and background, while each blur kernel is transformed, e.g., truncated or diminished in intensity, compared to early models. As shown in FIG. 6B, the foreground kernel is shortened in length to a proportion of $\alpha$, and the background kernel is reduced in intensity to a proportion of $1-\alpha$, where $\alpha$ is the blurred mask value of the corresponding pixel.

FIG. 6C is the case with the layered blur model according to the present disclosure, in which the blur kernel of the foreground experiences truncation equal to that of the recent model, but the blur kernel of the background is truncated instead of being weakened to a factor of $1-\alpha$. When the background is occluded by the foreground, the intensity of each pixel affecting blurred pixels does not reduce and the number of pixels reduces. Accordingly, it can be seen that the proposed model accurately represents occlusion during a blur process by representing a reduction in length, but not intensity, of the blur kernel.

Here, it can be seen that occlusion occurring due to the appearance and disappearance of the background results in accordingly different positional relationships between the background and foreground kernels. In order to extract the contribution of occlusion from a given blur kernel, when the kernel is divided into leading (direction of object motion) and lagging (direction opposite), in the case of background disappearance (as shown), the leading trail of the background and the lagging trail of the foreground remain after the kernel is cut. In the opposite case, the lagging trail of the background and the leading trail of the foreground remain.

Thus, the blur kernels of the foreground and the background can be separate or overlapped each other with changes in length of the remaining portions according to the relative velocity of the layers. These characteristics cannot be captured by conventional blur models.

Accordingly, the present disclosure proposes occlusion-aware video deblurring based on a new layered blur model. Although the conventional method achieved occlusion-aware deblurring even when both layers are dynamic, it is limited to particular cases.

The present disclosure demonstrated the limitations of the conventional method theoretically and experimentally, and enhanced a blur model by changing the order of layer composition and blur, so that it follows real blur generation process. Using the layered blur model according to the present disclosure, a deblurring method that obtains more accurate latent image, object motion and mask for each layer was proposed. Also, it was analyzed that the layered blur model according to the present disclosure exactly extracts the contribution of occlusion from the original kernel, helping the capture of the property to overlap or separate the foreground and background kernels at boundaries.

The video deblurring method based on a layered blur model as described in the foregoing may be embodied as an application or in the form of program instructions that can be executed through various computer components, and may be recorded in computer-readable recording media. The computer-readable recording media may include program instructions, data files and data structures, alone or in combination.

The program instructions recorded in the computer-readable recording media may be not only those designed or configured specially for the present disclosure, but also those known and available to those skilled in the field of computer software.

Examples of the computer-readable recording media include hardware devices specially configured to store and execute the program instructions, such as, magnetic media such as hard disks, floppy disks and magnetic tape, optical media such as CD-ROM and digital video disc (DVD), and magneto-optical media such as floptical disks, read-only memory (ROM), random access memory (RAM) and flash memories.

Examples of the program instructions include machine language code such as those created by a compiler, as well as a high level language code that can be executed by a computer using an interpreter. The hardware device may be configured to operate as at least one software module to perform processing according to the present disclosure, or vice versa.

While the present disclosure has been described hereinabove with reference to the embodiments, it will be apparent to those skilled in the art that various modifications and changes may be made without departing from the spirit and scope of the present disclosure set forth in the appended claims.

Current deblurring solutions excellently remove blurs caused by small shakes of cameras, but there are limitations in handling images including object motions or depth variations. Particularly, artifacts occurring at boundaries are a critical problem with deblurring of which the results at edges are important.

The present disclosure solved spatially-variant blurs caused by moving objects, and solved the deblurring problem by removing artifacts at boundaries. To solve this problem, many studies are being made by leading companies in the image processing market such as Adobe and Microsoft in U.S.A., and if the problems with moving objects and their boundaries can be overcome through the proposed technology, motivation to lead the global market will be triggered through foreign patent applications.

In addition, by removing motion blurs generated by movements of objects being imaged, the present disclosure can be used as technology for long-term missing person and suspect searches and for improving the performance of tracking and recognition technology through CCTV. According to the IMS Research report, the scale of global intelligent image analysis equipment maintains an annual growth rate of 30.9%, and is expected to be six hundred million dollars in 2015, so there is a high possibility of having a dominant position in the image analysis market by virtue of outstanding deblurring performance through the present disclosure.

Further, as the demand for high quality digital images is increasing with the spread of smart phones and DSLR and development of robots and smart devices, a wide range of applications in the field of image processing software are expected to emerge. In addition, it is expected that deblurring technology will be applied to the imaging diagnosis equipment industry which makes up the vast majority of the medical equipment market.

What is claimed is:

1. A video deblurring method based on a layered blur model, comprising:
    estimating a latent image, an object motion, and a mask for each layer in each frame using images comprising a combination of layers during an exposure time of a camera, in response to receiving a blurred video frame;
    applying the estimated latent image, object motion, and mask for each layer in each frame to the layered blur model to generate a blurry frame;
    comparing the generated blurry frame and the received blurred video frame;
    iteratively repeating the estimating, the applying, and the comparing, in response to determining that the generated blurry frame and the received blurred video frame fail to match; and
    outputting a final latent image based on the estimated object motion and mask for each layer in each frame, in response to determining that the generated blurry frame and the received blurred video frame match.

2. The video deblurring method according to claim 1, wherein the estimating of the latent image, the object motion, and the mask for each layer in each frame comprises
    estimating a latent image for each layer in each frame,
    estimating a motion for each layer in each frame, and
    estimating a mask for each layer in each frame.

3. The video deblurring method according to claim 1, wherein the estimating of the latent image, the object motion, and the mask for each layer in each frame comprises
    estimating a latent image of a foreground layer and a latent image of a background layer in each frame,
    estimating a motion of the foreground layer and a motion of the background layer in each frame, and
    estimating a layer mask in each frame.

4. The video deblurring method according to claim 1, wherein the layered blur model uses the following equation:

$$B_i = \frac{1}{M}\sum_{k=1}^{M}\left(\left(1 - W_{i,t_k}^1 g^1\right) \odot W_{i,t_k}^0 a^0 + W_{i,t_k}^1 a^1\right)$$

where $B_i$ is a generated ith blurry frame, M is a number of intervals used to divide the exposure time of the camera uniformly, $a^l$ is a latent image of a layer l, $g^l$ is a mask of the layer l, $W_{i,t}^l$ is a warping matrix that warps an image to an intermediate image at time $t^{i-1}+t$ for the layer l, $t^i$ is a time at frame l, and $t_k$ is each time at which the exposure time is divided into M intervals uniformly.

5. The video deblurring method according to claim 4, wherein the warping matrix is obtained by linearly interpolating the motion between frames.

6. The video deblurring method according to claim 1, wherein the determining that the generated blurry frame and the received blurred video frame match occurs in response to a data difference between the generated blurry frame and the received blurred video frame being less than or equal to a threshold.

7. The video deblurring method according to claim 1, wherein in response to the iteratively repeating of the estimating, the applying, and the comparing being performed for a preset number of times, an object motion and a mask for each layer in a blurry frame having a data difference between the generated blurry frame and the received blurred video frame closest to the threshold are used.

8. A non-transitory computer-readable storage medium storing instructions that, when executed by a processor, cause the processor to perform the method of claim 1.

9. A video deblurring device using a layered blur model, comprising:
    a reverse estimation unit configured to estimate a latent image, an object motion, and a mask for each layer in each frame using images comprising a combination of layers during an exposure time of a camera, in response to receiving a blurred video frame;
    a blurry frame generation unit configured to apply the estimated latent image, object motion, and mask for each layer in each frame to the layered blur model to generate a blurry frame;
    a data comparison unit configured to compare the generated blurry frame and the received blurred video frame; and
    a deblurring unit configured to output a final latent image based on the estimated object motion and the estimated mask for each layer in each frame, in response to determining that the generated blurry frame and the received blurred video frame match,
    wherein in response to the data comparison unit determining that the generated blurry frame and the received blurred video frame fail to match, the reverse estimation unit is further configured to iteratively perform the estimating, the blurry fame generation unit is further configured to iteratively perform the applying, and the data comparison unit is configured to iteratively perform the comparing.

10. The video deblurring device according to claim 9, wherein the reverse estimation unit comprises an image estimation unit configured to estimate the latent image for each layer in each frame, a motion estimation unit configured to estimate the motion for each layer in each frame, and a mask estimation unit configured to estimate the mask for each layer in each frame.

11. The video deblurring device according to claim 9, wherein the reverse estimation unit comprises an image estimation unit configured to estimate a latent image of a foreground layer and a latent image of a background layer in each frame, a motion estimation unit configured to estimate a motion of the foreground layer and a motion of the background layer in each frame, and a mask estimation unit configured to estimate the layer mask in each frame.

12. The video deblurring device based on the layered blur model according to claim 9, wherein the blurry frame generation unit is further configured to use the layered blur model using the following equation:

$$B_i = \frac{1}{M} \sum_{k=1}^{M} \left( \left(1 - W^1_{i,t_k} g^1\right) \odot W^0_{i,t_k} a^0 + W^1_{i,t_k} a^1 \right)$$

where $B_i$ is a generated ith blurry frame, M is a number of intervals used to divide the exposure time of the camera uniformly, $a^l$ is a latent image of a layer l, $g^l$ is a mask of the layer l, $W_{i,t}^l$ is a warping matrix that warps an image to an intermediate image at time $t^{i-1}+t$ for the layer l, $t^i$ is a time at frame l, and $t_k$ is each time at which the exposure time is divided into M intervals uniformly.

13. The video deblurring device according to claim 12, wherein the warping matrix is obtained by linearly interpolating the motion between frames.

14. The video deblurring device according to claim 9, wherein the data comparison unit is further configured to determine that the generated blurry frame and the received blurred video frame match, in response to a data difference between the generated blurry frame and the received blurred video frame being less than or equal to a threshold.

15. The video deblurring device according to claim 9, wherein the deblurring unit is further configured to output the final latent image using an object motion and a mask for each layer in a blurry frame having a data difference between the generated blurry frame and the received blurred video frame closest to the threshold, in response to the reverse estimation unit iteratively performing the estimation for a preset number of times.

16. A video deblurring method based on a layered blur model, comprising:

estimating a latent image, an object motion, and a mask for each layer in each frame using images comprising a combination of layers during an exposure time of a camera, in response to receiving a blurred video frame;

applying the estimated latent image, object motion, and mask for each layer in each frame to the layered blur model to generate a blurry frame;

comparing the generated blurry frame and the received blurred video frame; and outputting a final latent image based on the estimated object motion and the estimated mask for each layer in each frame, in response to determining that the generated blurry frame and the received blurred video frame match, wherein the layered blur model uses the following equation:

$$B_i = \frac{1}{M} \sum_{k=1}^{M} \left( \left(1 - W^1_{i,t_k} g^1\right) \odot W^0_{i,t_k} a^0 + W^1_{i,t_k} a^1 \right)$$

where $B_i$ is a generated ith blurry frame, M is a number of intervals used to divide the exposure time of the camera uniformly, $a^l$ is a latent image of a layer l, $g^l$ is a mask of the layer l, $W_{i,t}^l$ is a warping matrix that warps an image to an intermediate image at time $t^{i-1}+t$ for the layer l, $t^i$ is a time at frame l, and $t_k$ is each time at which the exposure time is divided into M intervals uniformly.

* * * * *